US012175902B1

(12) United States Patent
Tian

(10) Patent No.: US 12,175,902 B1
(45) Date of Patent: Dec. 24, 2024

(54) DETECTION METHOD FOR DISPLAY PANEL AND DETECTION DEVICE FOR DISPLAY PANEL

(71) Applicant: Shenzhen China Star Optoelectronics Semiconductor Display Technology Co., Ltd., Guangdong (CN)

(72) Inventor: Fan Tian, Guangdong (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/527,218

(22) Filed: Dec. 1, 2023

(30) Foreign Application Priority Data

Aug. 11, 2023 (CN) ........................ 202311019848.4

(51) Int. Cl.
*G09G 3/00* (2006.01)
*G09G 3/20* (2006.01)
*G09G 3/3233* (2016.01)

(52) U.S. Cl.
CPC ........... *G09G 3/006* (2013.01); *G09G 3/2096* (2013.01); *G09G 3/3233* (2013.01); *G09G 2300/0819* (2013.01); *G09G 2300/0842* (2013.01); *G09G 2330/12* (2013.01)

(58) Field of Classification Search
CPC .... G09G 3/006; G09G 3/2096; G09G 3/3233; G09G 2300/0819; G09G 2300/0842; G09G 2330/12
See application file for complete search history.

(56) References Cited

U.S. PATENT DOCUMENTS

2021/0407435 A1* 12/2021 Tang ...................... H10K 59/13
2022/0122512 A1* 4/2022 Lee ...................... G09G 3/3233
2023/0290306 A1* 9/2023 Byun ................... G09G 3/3233
2023/0317007 A1* 10/2023 Kim ..................... G09G 3/3233 345/76
2024/0038123 A1* 2/2024 Sang .................... G09G 3/3233
2024/0054949 A1* 2/2024 Dou ..................... G09G 3/3233

* cited by examiner

*Primary Examiner* — Andrew Sasinowski
(74) *Attorney, Agent, or Firm* — PV IP PC; Wei Te Chung

(57) ABSTRACT

A detection method and a detection device for a display panel are provided. The detection method includes: performing a detection operation on pixel-driving circuits. The detection operation includes applying a gate voltage and a source voltage to a gate and a source of each driving transistor, to turn on a driving transistor; and sampling voltages at the sources. The detection operation is repeated n times, where in each repetition, the gate voltage is the sum of the gate voltage in the initial detection operation and an accumulative addition of a difference between the gate voltage and the sampled voltage in the previous detection operation, with n being a positive integer. Based on the sampled voltage of the driving transistor of each pixel-driving circuit obtained in the n-th repetition of the detection operation, it is determined whether the threshold voltage of the driving transistor in the pixel-driving circuit is abnormal.

18 Claims, 5 Drawing Sheets

DETECTION METHOD FOR DISPLAY PANEL AND DETECTION DEVICE FOR DISPLAY PANEL

CROSS-REFERENCE TO RELATED APPLICATION

This application claims the benefit of priority of Chinese Patent Application No. 202311019848.4, filed on Aug. 11, 2023, the disclosure of which is incorporated herein by reference in its entirety.

FIELD OF DISCLOSURE

The present application relates to a field of display technology, specifically relating to a detection method for a display panel and a detection device for the display panel.

DESCRIPTION OF RELATED ART

In conventional organic light-emitting diode (OLED) display panels, there is an issue of threshold voltage drift in the driving transistors, which affects the light emission performance of the OLEDs.

In the related technology, the threshold voltage of the driving transistors is first detected, and then compensation is applied to the driving data of the display panel. This approach can reduce the impact of the threshold voltage drift of the driving transistors. However, the inventor has found that the detected threshold voltages include abnormal threshold voltages caused by short-circuit within the pixel-driving circuits. Since these abnormal threshold voltages are close to the normal threshold voltages, it is challenging to distinguish the abnormal threshold voltages from the detected threshold voltages.

SUMMARY OF INVENTION

The present application provides a detection method for a display panel and a detection device for the display panel, aiming to improve the technical problem of not being able to distinguish abnormal threshold voltages from the detected threshold voltages.

The present application provides a detection method for a display panel, for detecting the display panel, wherein the display panel includes a plurality of light-emitting devices and a plurality of pixel-driving circuits connected to the light-emitting devices, each of pixel-driving circuits includes a driving transistor, a source of each driving transistor is electrically connected to a first voltage terminal through the corresponding light-emitting device, a drain of each driving transistor is electrically connected to a second voltage terminal, and the display panel detection method includes following steps: performing a detection operation on the pixel-driving circuits by applying a gate voltage and a source voltage to a gate and the source of each driving transistor, to turn on the driving transistor, and sampling voltages at the sources as sampled voltages; repeating the detection operation n times, wherein in each repetition of the detection operation, the gate voltage is a sum of the gate voltage in the initial detection operation, and an accumulative addition of a difference between the gate voltage and the sampled voltage in the previous detection operation, where n is a positive integer; and determining whether a threshold voltage of the driving transistor in each pixel-driving circuit is abnormal, based on the sampled voltage of the driving transistor of each of the pixel-driving circuits from the n-th repeated detection operation.

In some embodiments, the step of determining whether the threshold voltage of the driving transistor in each pixel-driving circuit is abnormal based on the sampled voltage of the driving transistor of each of the pixel-driving circuits from the n-th repeated detection operation, includes: determining whether the threshold voltage of the driving transistor of the pixel driving circuit is abnormal by comparing an absolute difference between the sampled voltage of the driving transistor of each of the pixel-driving circuits from the n-th repeated detection operation and the gate voltage from the n-th repeated detection operation, with a preset voltage.

In some embodiments, the step of determining whether the threshold voltage of the driving transistor of the pixel driving circuit is abnormal by comparing the absolute difference between the sampled voltage of the driving transistor of each of the pixel-driving circuits from the n-th repeated detection operation and the gate voltage from the n-th repeated detection operation, with the preset voltage, includes: when the absolute difference between the sampled voltage of the driving transistor of each of the pixel driving circuits from the n-th repeated detection operation and the gate voltage from the n-th repeated detection operation is greater than the preset voltage, it is determined that the threshold voltage of the driving transistor of the pixel-driving circuit is abnormal, and the pixel-driving circuit where the abnormal threshold voltage is detected is an abnormal pixel-driving circuit.

In some embodiments, the detection method further includes: replacing an abnormal threshold voltage of the driving transistor in each of the abnormal pixel-driving circuits by a substitute value; and storing the substitute values of the replaced threshold voltages of the driving transistors of the pixel-driving circuits for compensation.

In some embodiments, the substitute values are the threshold voltages of the driving transistors of the normal pixel-driving circuits around the abnormal pixel-driving circuits.

In some embodiments, the substitute values are an average value of the threshold voltages of the normal driving transistors of the pixel driving circuits.

In some embodiments, the detection method further includes: transmitting a location information of each abnormal pixel-driving circuit to a repair device, for the repair device to repair each abnormal pixel driving circuit.

In some embodiments, the step of determining whether the threshold voltage of the driving transistor of the pixel driving circuit is abnormal by comparing the absolute difference between the sampled voltage of the driving transistor of each of the pixel-driving circuits from the n-th repeated detection operation and the gate voltage from the n-th repeated detection operation, with the preset voltage, includes: when the absolute difference between the sampled voltage of the driving transistor of each pixel-driving circuit from the n-th repeated detection operation and the gate voltage from the n-th repeated detection operation is less than or equal to the preset voltage, it is determined that the threshold voltage of the driving transistor of the pixel-driving circuit is normal.

In some embodiments, each of the pixel-driving circuits further includes a scanning transistor, a detection transistor, and a capacitor; for each pixel-driving circuit, a source of the scanning transistor is electrically connected to a data line, a drain of the scanning transistor is electrically connected to the gate of the driving transistor, and a gate of the scanning transistor is electrically connected to a scan line, while a source of the detection transistor is electrically connected to the source of the driving transistor, and a drain of the detection transistor is electrically connected to a detection line, wherein the detection line is electrically connected to an initialization voltage terminal through a first switch, the detection line is also electrically connected to a sampling device through a second switch, a gate of the detection transistor is electrically connected to a control line, and the capacitor is electrically connected between the gate of the driving transistor and the source of the driving transistor.

The present application further provides a detection device for a display panel, for detecting the display panel, wherein the display panel includes a plurality of light-emitting devices and a plurality of pixel-driving circuits connected to the light-emitting devices, each of pixel-driving circuits includes a driving transistor, a source of each driving transistor is electrically connected to a first voltage terminal through the corresponding light-emitting device, a drain of each driving transistor is electrically connected to a second voltage terminal, and the display panel detection device includes: a control device configured to perform a detection operation on the pixel-driving circuits, wherein the detection operation includes: applying a gate voltage and a source voltage to a gate and the source of each of the driving transistors, to turn on the driving transistor; repeating the detection operation n times, wherein in each repeated detection operation, the gate voltage is a sum of the gate voltage in the initial detection operation, and an accumulative addition of a difference between the gate voltage and a sampled voltage in the previous detection operation, where n is a positive integer; and determining whether a threshold voltage of the driving transistor in each pixel-driving circuit is abnormal, based on the sampled voltage of the driving transistor of each of the pixel-driving circuits from the n-th repeated detection operation; a sampling device configured to sample voltages at the sources as the sampled voltages in the initial detection operation and the repeated detection operations.

In the detection method and the detection device for the display panel provided by the embodiments of this application, through repeated n detection operations, it is possible to amplify the discrepancy between the sampled voltages of normal pixel-driving circuits and those abnormal pixel-driving circuits due to short circuits. This allows for the abnormal threshold voltages to be identified from the detected threshold voltages, thereby making it easier to distinguish between the normal pixel-driving circuits and the abnormal pixel-driving circuits that are abnormal due to short circuits.

BRIEF DESCRIPTION OF DRAWINGS

To clarify the technical solutions in the embodiments of the present application, the drawings used in the description of the embodiments are briefly introduced below. It is evident that the drawings described below are only some embodiments of this application, and for those skilled in the art, other drawings can be obtained from these drawings without creative effort.

DETAILED DESCRIPTION OF EMBODIMENTS

Figure 1:
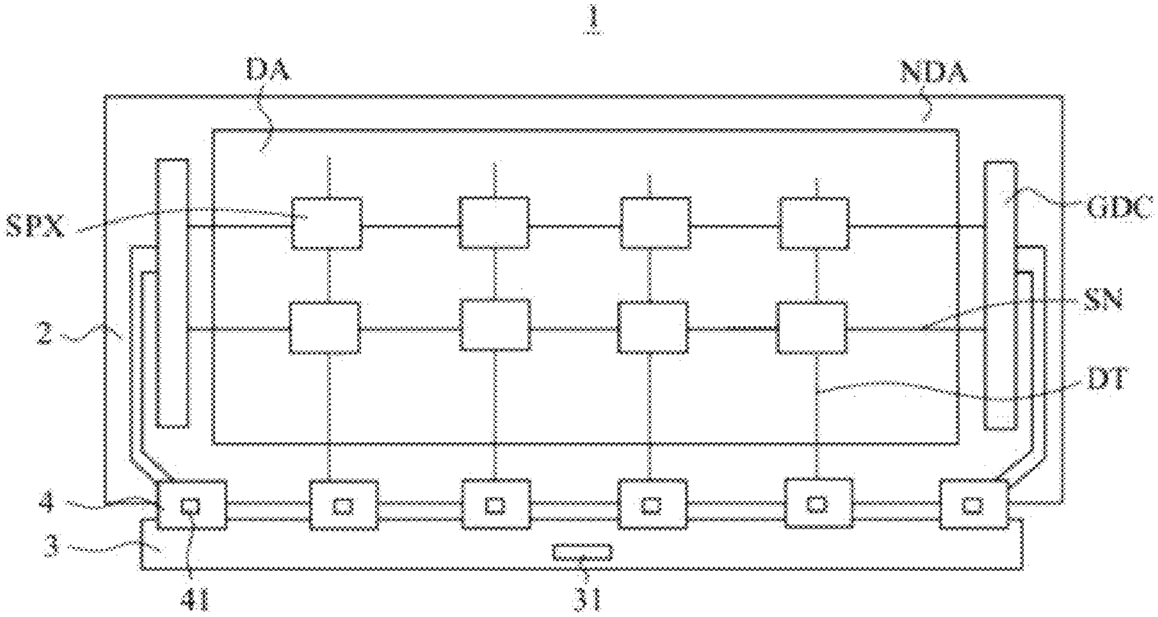
FIG. 1 is a schematic plan view of a display panel according to one embodiment of the present application.

The technical solutions of the present application are described with reference to the accompanying drawings with reference to the embodiments. The embodiments described here are only a part of the embodiments, not all the embodiments. Based on these embodiments, all other embodiments obtained by those skilled in the art without creative effort fall within the scope of the protection scope of the present application. Additionally, it should be understood that the specific embodiments described here are only for explaining and illustrating the present application and not for limiting the present application. In this application, unless stated otherwise, orientation terms such as "up" and "down" generally refer to the directions when the device is in actual use or working state, specifically as shown in the drawing; "inside" and "outside" refer to the contours of the device.

As shown in FIG. 1, one embodiment of the present application provides a display device 1. The display device 1 can include a display panel 2, a circuit board 3, and a chip on film (COF) 4. The display panel 2 can be an OLED display panel. The circuit board 3 can be a rigid printed circuit board. The COF 4 can be a flexible circuit board.

The display panel 2 includes a display area DA and a non-display area NDA. The display area DA can be an area for arranging subpixels SPX for displaying images. The non-display area NDA can be an area for arranging driving units that provide driving signals to the subpixels SPX and some lines such as power lines connecting the driving units. The non-display area NDA can be set on at least one side of the display area DA and may partially surround the display area DA.

The display panel 2 includes multiple subpixels SPX, data lines DT, scanning lines SN, and a gate driving circuit GDC. The subpixels SPX are located within the display area DA. The gate driving circuit GDC is in the non-display area NDA, driving multiple rows of the subpixels SPX through the scanning lines SN to sequentially turn on the rows of subpixels SPX. Meanwhile, the data lines DT sequentially load data signals to the rows of subpixels SPX, enabling the display panel 2 to show a complete frame image within a frame time.

The COF 4 includes a source driver chip 41 for transmitting data signals to the data lines DT.

The circuit board 3 includes a timing control chip 31. The timing control chip 31 is electrically connected to the source driver chip 41 and the gate driving circuit GDC to control their timing. Thus, the timing control chip 31 on the circuit board 3 controls the source driver chip 41 and the gate driving circuit GDC to work in a reasonable timing, driving the subpixels SPX of the display panel 2 to emit light according to a set timing through the scanning lines SN and data lines DL.

Figure 2A:
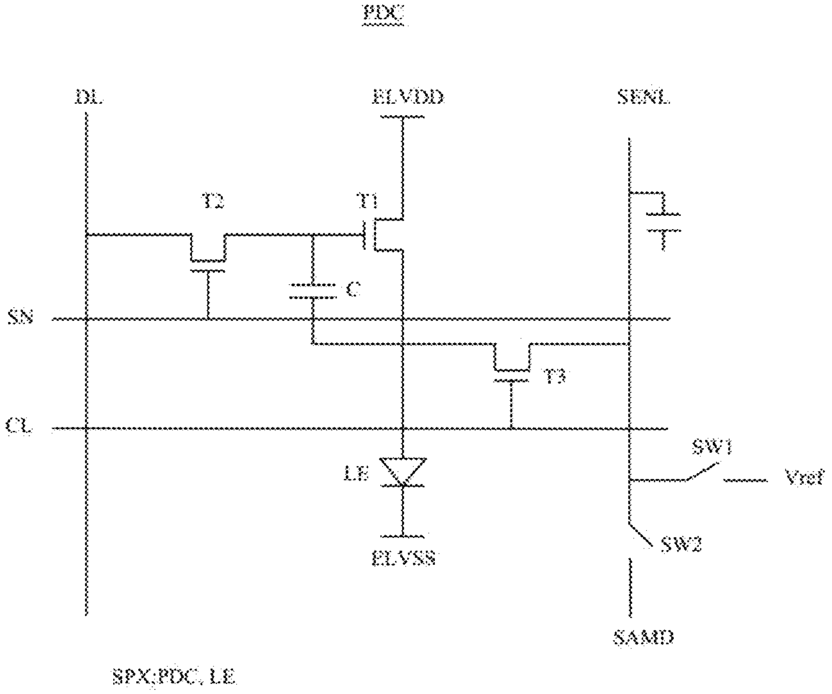
FIG. 2A is a schematic circuit diagram of a normal subpixel in the display panel of FIG. 1.

Referring to FIG. 2A, each subpixel SPX includes a light-emitting device LE and a pixel-driving circuit PDC. In this embodiment, the light-emitting device LE can be an organic light-emitting diode (OLED).

The pixel-driving circuit PDC includes a driving transistor T1, a scanning transistor T2, and a capacitor C. A source of the driving transistor T1 is electrically connected to the first voltage terminal ELVDD through the light-emitting device LE, and a drain of the driving transistor T1 is connected to a second voltage terminal ELVSS. A source of the scanning transistor T2 is connected to the corresponding data line DL, a drain of the scanning transistor T2 is connected to a gate of the driving transistor T1, and a gate of the scanning transistor T2 is connected to the corresponding scanning line SN. The capacitor C is electrically connected between the gate of the driving transistor T1 and the source of the driving transistor T1. Thus, by controlling the scanning line SN, the scanning transistor T2 can be turned on, loading the data voltage on the data line DL to the gate of the driving transistor T1. A voltage difference between the gate and the source of the driving transistor T1 is controlled to turn the driving transistor T1 on, allowing the driving transistor T1 to generate a driving current between the first voltage terminal ELVDD and the second voltage terminal ELVSS according to the data voltage, driving the light-emitting device LE to emit light.

However, due to manufacturing processes, the driving transistor T1 generally has a threshold voltage Vth, and threshold voltage drifts can affect the light emission of the light-emitting device LE. To detect the threshold voltage Vth of the driving transistor T1 of each pixel-driving circuit PDC, the pixel-driving circuit PDC also includes a detection transistor T3. A source of the detection transistor T3 is electrically connected to the source of the driving transistor T1, a drain of the detection transistor T3 is connected to a detection line SENL, and a gate of the detection transistor T3 is connected to the control line CL. The detection line SENL is electrically connected to an initialization voltage terminal Vref through a first switch SW1, and also to a sampling device SAMD through a second switch SW2. The detection line SENL also forms a capacitor with a ground terminal.

This way, during a pre-charge phase, the scanning line SN and the control line are high potentials, controlling the scanning transistor T2 and the detection transistor T3 to be turned on, thus transferring the data voltage from the data line DL to the gate of the driving transistor T1. The first switch SW1 is turned on, allowing an initialization voltage from the initialization voltage terminal to be transmitted to the source of the driving transistor T1. At this time, the voltage difference between the gate and the source of the driving transistor T1 is greater than the threshold voltage Vth of the driving transistor T1.

In a detection phase, the first switch SW1 is turned off. Since the voltage difference between the gate and the source of the driving transistor T1 is greater than the threshold voltage Vth of the driving transistor T1, the current flows from the first voltage terminal ELVDD to the second voltage terminal ELVSS, causing the voltage at the source of the driving transistor T1 to rise continuously. When the voltage difference between the gate and the source of the driving transistor T1 equals the threshold voltage Vth of the driving transistor T1, the voltage at the source of the driving transistor T1 remains stable.

In a sampling phase, the second switch SW2 is turned on, and the detection device can obtain the voltage at the source of the driving transistor T1 through the detection line SENL, thus calculating the threshold voltage Vth of the driving transistor T1. In this way, the threshold voltage Vth can be compensated through a compensation algorithm, reducing the impact of the threshold voltage Vth on the display.

Figure 3A:
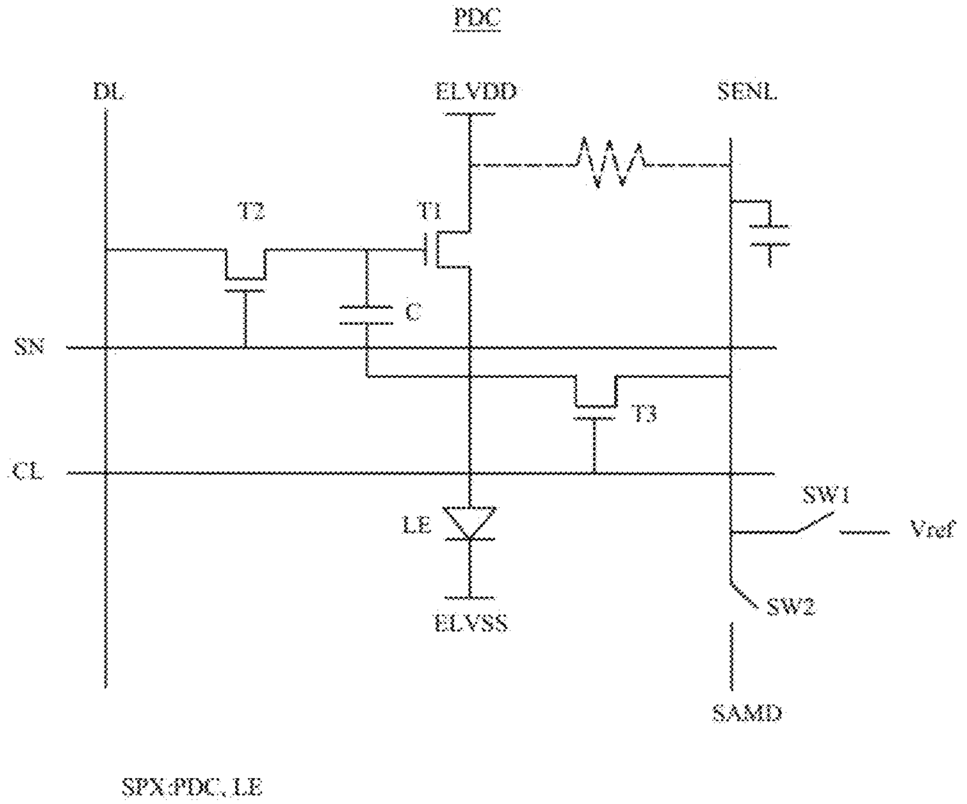
FIG. 3A is a schematic circuit diagram of an abnormal subpixel in the display panel of FIG. 1.

However, the inventor found that some pixel-driving circuits PDC may experience short-circuit. As shown in FIG. 3A, the detection line SENL is short-circuited with the first voltage terminal ELVDD. Thus, the threshold voltage Vth obtained in this manner includes abnormal threshold voltages caused by short-circuit within the pixel-driving circuit PDC. Since the abnormal threshold voltage Vth is close to the normal threshold voltage Vth, it is impossible to distinguish the abnormal threshold voltage Vth from the detection data, leading to abnormal display after compensation.

Figure 4:
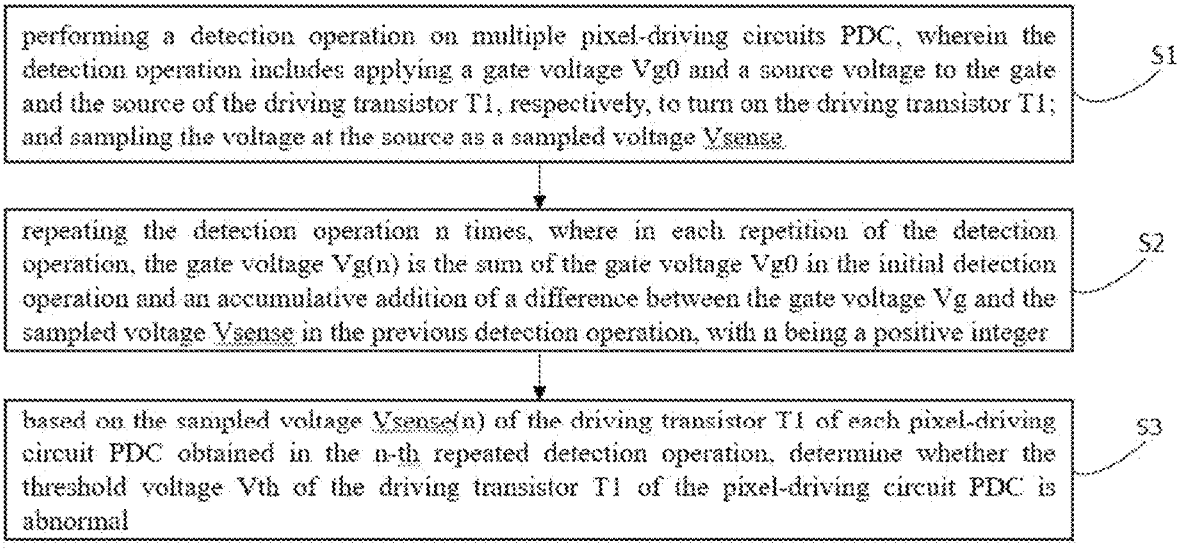
FIG. 4 is a process flow diagram of a detection method for the display panel according to one embodiment of the invention.

Therefore, referring to FIG. 4, the present application provides a detection method for a display panel, which includes following steps.

S1: performing a detection operation on multiple pixel-driving circuits PDC, wherein the detection operation includes applying a gate voltage Vg0 and a source voltage to the gate and the source of the driving transistor T1, respectively, to turn on the driving transistor T1; and sampling the voltage at the source as a sampled voltage Vsense.

Figure 2B:
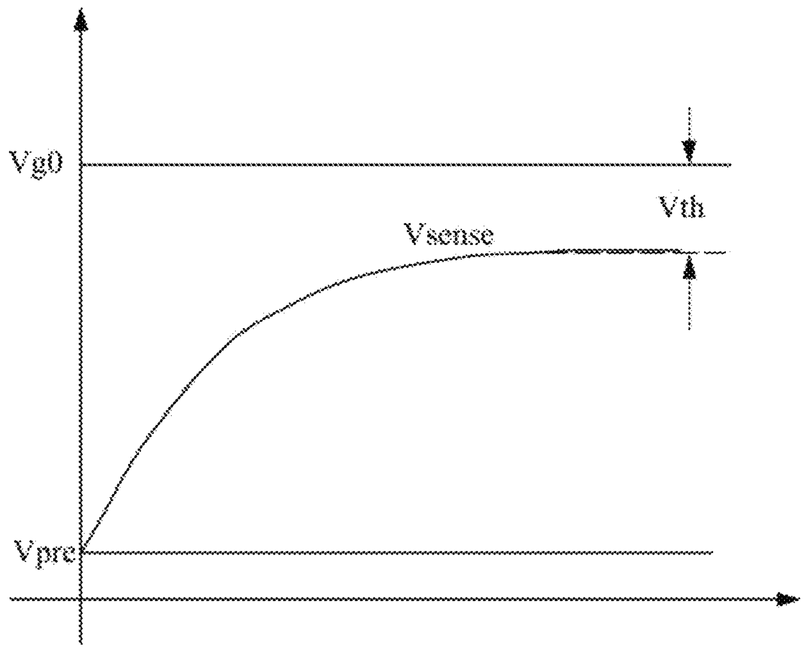
FIG. 2B is a schematic diagram showing a detection operation of the subpixel in FIG. 2A.
Figure 3B:
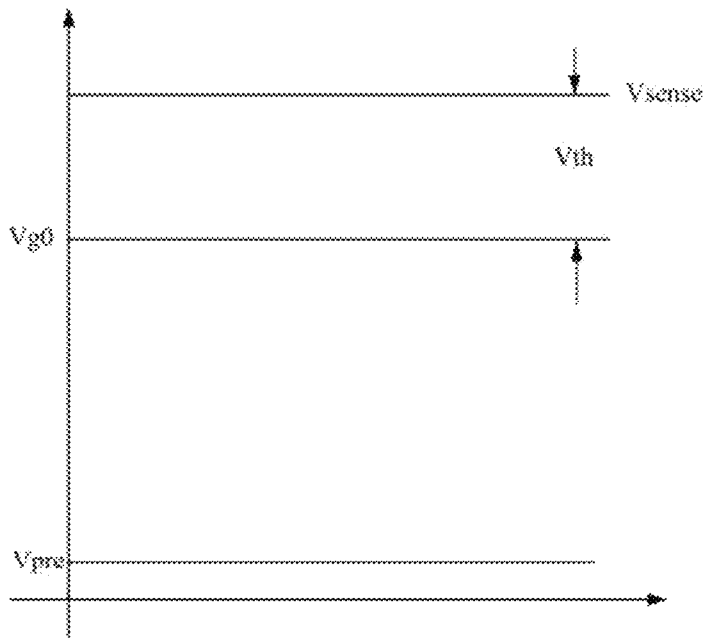
FIG. 3B is a schematic diagram showing a detection operation of the subpixel in FIG. 3A.

The sampling is performed after the voltage (sampled voltage Vsense) at the source stabilizes, ensuring more accurate results. Thus, through the initial detection operation, the sampled voltages Vsense at the sources of the driving transistors T1 of multiple pixel-driving circuits PDC can be obtained. As shown in FIG. 2B, for normal pixel-driving circuits PDC, the first sampled voltage Vsense can be approximated as a difference between the gate voltage Vg0 and the threshold voltage Vth of the driving transistor. As shown in FIG. 3B, due to short-circuit in the abnormal pixel-driving circuit PDC, the first sampled voltage Vsense is affected by the short circuit and can be approximated as a fixed value. Therefore, multiple sampled voltages Vsense may contain both normal sampled voltages Vsense corresponding to normal pixel-driving circuits PDC and abnormal sampled voltages Vsense corresponding to abnormal pixel-driving circuits PDC.

S2: repeating the detection operation n times, where in each repetition of the detection operation, the gate voltage Vg(n) is the sum of the gate voltage Vg0 in the initial detection operation and an accumulative addition of a difference between the gate voltage Vg and the sampled voltage Vsense in the previous detection operation, with n being a positive integer. For example, n could be 1, 2, 3, 4, etc.

Figure 2C:
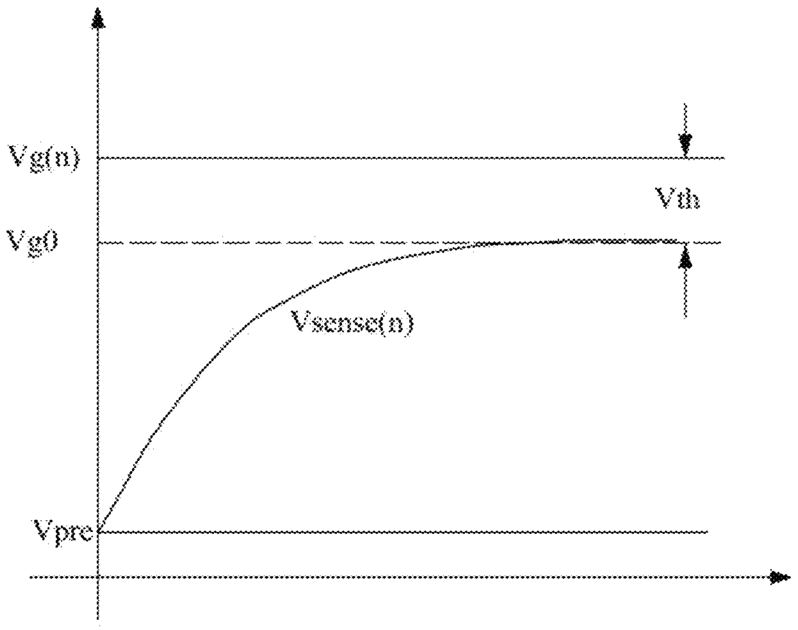
FIG. 2C is a schematic diagram showing a repeated detection operation of the subpixel in FIG. 2A.
Figure 3C:
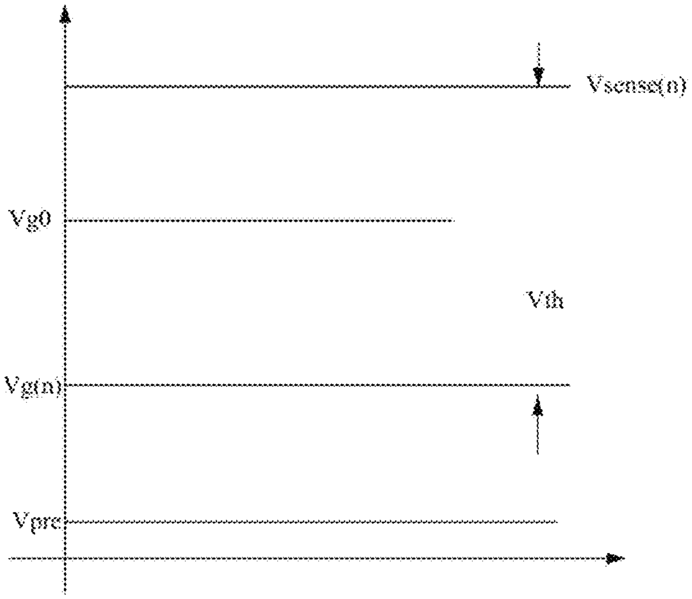
FIG. 3C is a schematic diagram showing a repeated detection operation of the subpixel in FIG. 3A.

It should be noted that the difference between the gate voltage Vg and the sampled voltage Vsense from the previous detection operation is the threshold voltage Vth from the previous detection operation. As shown in FIG. 2C, for normal pixel-driving circuits PDC, the threshold voltage Vth obtained from each detection remains within a stable range, which can be considered a fixed value. Therefore, a difference between the sampled voltage Vsense(n) and the gate voltage Vg(n) obtained in the n-th repetition of the detection operation can be considered equal to the threshold voltage Vth, having a small absolute value, and the sampled voltage Vsense(n) is very close to the initial gate voltage Vg0. However, as shown in FIG. 3C, for the pixel-driving circuits PDC that are abnormal due to short circuits between the detection line SENL and the first voltage terminal ELVDD, the sampled voltage Vsense detected is an abnormal voltage caused by the short circuit and can be considered a fixed value. In multiple repeated detection operations, the absolute value of the difference between the sampled voltage Vsense and the gate voltage Vg for abnormal pixel-driving circuits PDC increases progressively. This results in a large absolute value of the difference between the sampled voltage Vsense (n) and the gate voltage Vg(n) in the n-th repeated detection operation for abnormal pixel-driving circuits PDC.

S3: based on the sampled voltage Vsense(n) of the driving transistor T1 of each pixel-driving circuit PDC obtained in the n-th repeated detection operation, determine whether the threshold voltage Vth of the driving transistor T1 of the pixel-driving circuit PDC is abnormal. Therefore, by amplifying the discrepancy in sampled voltages between normal and abnormal pixel-driving circuits PDC through repeated n detection operations, it becomes easier to differentiate normal pixel-driving circuits PDC from abnormal pixel-driving circuits PDC.

Figure 5:
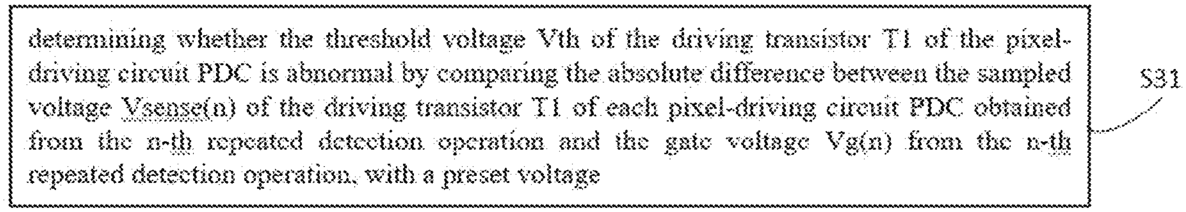
FIG. 5 is a process flow diagram of the detection method for the display panel according to one embodiment of the invention.

Referring to FIG. 5, step S3 includes:

S31: determining whether the threshold voltage Vth of the driving transistor T1 of the pixel-driving circuit PDC is abnormal by comparing the absolute difference between the sampled voltage Vsense(n) of the driving transistor T1 of each pixel-driving circuit PDC obtained from the n-th repeated detection operation and the gate voltage Vg(n) from the n-th repeated detection operation, with a preset voltage. Thus, by comparing the absolute difference between the sampled voltage Vsense(n) of the pixel-driving circuit PDC obtained from the n-th detection operation and the gate voltage Vg(n) obtained from the n-th detection operation, with a reasonable preset voltage, it's possible to effectively determine whether the threshold voltage Vth of the driving transistor T1 of the pixel-driving circuit PDC is abnormal.

Figure 6:
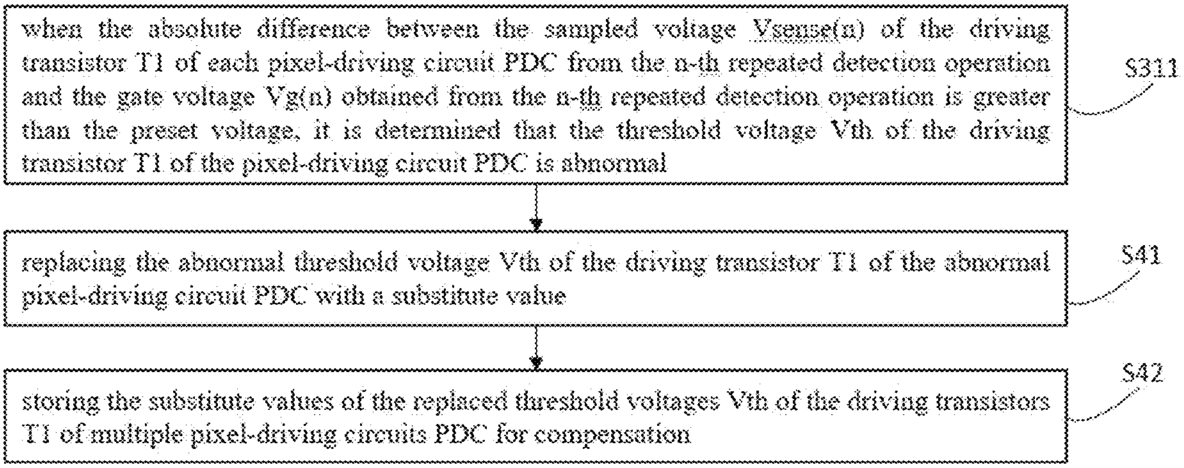
FIG. 6 is a process flow diagram of the detection method for the display panel according to one embodiment of the invention.
Figure 7:
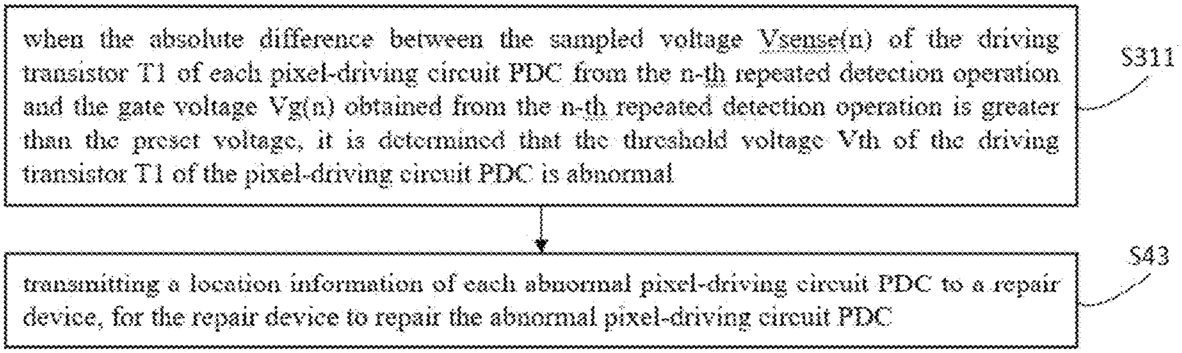
FIG. 7 is a process flow diagram of the detection method for the display panel according to one embodiment of the invention.
Figure 8:
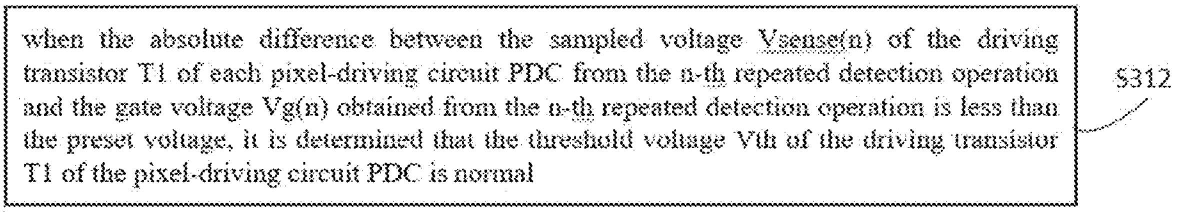
FIG. 8 is a process flow diagram of the detection method for the display panel according to one embodiment of the invention.

Referring to FIGS. 6-8, step S31 includes:

S311: when the absolute difference between the sampled voltage Vsense(n) of the driving transistor T1 of each pixel-driving circuit PDC from the n-th repeated detection operation and the gate voltage Vg(n) obtained from the n-th repeated detection operation is greater than the preset voltage, it is determined that the threshold voltage Vth of the driving transistor T1 of the pixel-driving circuit PDC is abnormal.

S312: when the absolute difference between the sampled voltage Vsense(n) of the driving transistor T1 of each pixel-driving circuit PDC from the n-th repeated detection operation and the gate voltage Vg(n) obtained from the n-th repeated detection operation is less than the preset voltage, it is determined that the threshold voltage Vth of the driving transistor T1 of the pixel-driving circuit PDC is normal.

Generally, for the pixel-driving circuits PDC that are abnormal due to short circuits, the sampled voltages Vsense detected are abnormal voltages caused by the short circuits and are not compensated by the repeated detection operations. Therefore, after n repeated detection operations, the sampled voltage Vsense(n) has a significant offset relative to the gate voltage Vg(n) in the n-th detection operation. Hence, it can be assumed that when the absolute difference between the sampled voltage Vsense(n) of the driving transistor T1 of each pixel-driving circuit PDC from the n-th repeated detection operation and the gate voltage Vg(n) obtained from the n-th repeated detection operation is greater than the preset voltage, the pixel-driving circuit PDC is abnormal. When the absolute difference between the sampled voltage Vsense(n) of the driving transistor T1 of each pixel-driving circuit PDC from the n-th repeated detection operation and the gate voltage Vg(n) obtained from the n-th repeated detection operation is less than or equal to the preset voltage, the pixel-driving circuit PDC is normal.

Referring to FIG. 6, when determining that the pixel-driving circuit PDC is abnormal, the detection method further includes:

S41: replacing the abnormal threshold voltage Vth of the driving transistor T1 of the abnormal pixel-driving circuit PDC with a substitute value;

S42: storing the substitute values of the replaced threshold voltages Vth of the driving transistors T1 of multiple pixel-driving circuits PDC for compensation.

In this way, after replacing the abnormal threshold voltage Vth, the substitute value can be stored in a flash memory of the circuit board 3. When the display panel 2 displays, based on the stored threshold voltages Vth, the data voltage on the data line DL can be appropriately compensated, thus reducing the impact of the threshold voltage Vth on the display. The substitute value can be the threshold voltage Vth of the driving transistor T1 of the normal pixel-driving circuits PDC surrounding the abnormal pixel-driving circuit PDC, or it can be an average value of the threshold voltages Vth of the driving transistors T1 of the normal pixel-driving circuits PDC.

Referring to FIG. 7, when determining that the pixel-driving circuit PDC is abnormal, the detection method further includes:

S43: transmitting a location information of each abnormal pixel-driving circuit PDC to a repair device, for the repair device to repair the abnormal pixel-driving circuit PDC.

In this way, the subsequent repair device, such as a laser cutting device, can conveniently laser cut short-circuited lines in the abnormal pixel-driving circuits PDC.

This application further provides a detection device for a display panel, for detecting the aforementioned display panel. The detection device includes:

- a control device configured to perform a detection operation on the plurality of pixel-driving circuits PDC, wherein the detection operation includes: applying a gate voltage Vg0 and a source voltage to a gate and the source of each of the driving transistors T1, to turn on the driving transistor T1; repeating the detection operation n times, where in each repeated detection operation, the gate voltage is the sum of the gate voltage Vg0 from the initial detection operation and an accumulative addition of a difference between the gate voltage Vg and a sampled voltage Vsense from the previous detection operation, where n is a positive integer. Based on the sampled voltage Vsense(n) of the driving transistor T1 of each of the pixel-driving circuits PDC obtained from the n-th repeated detection operation, it is determined whether the threshold voltage Vth of the driving transistor T1 in the pixel-driving circuit PDC is abnormal. For example, the control device can be a processor, which controls a gate driving circuit GDC and the source driver chip 41 to output the gate voltage Vg0 and a data voltage through executing program instructions.

A sampling device SAMD, configured to: sample the source voltages Vsense during the initial detection operation and the repeated detection operations. For example, the sampling device SAMD can be an analog-to-digital converter (ADC).

Thus, by amplifying the discrepancy in the sampled voltages between the normal and abnormal pixel-driving circuits through the repeated "n" detection operations, it becomes easier to distinguish between normal and abnormal pixel-driving circuits.

In this disclosure, specific examples are used to explain the principles and implementation methods of the invention. The descriptions of the above embodiments are only intended to help understand the methods of the invention and its core ideas. At the same time, for those skilled in the art, there will be changes in specific implementation methods and application scopes based on the ideas of the invention. In conclusion, the contents of this specification should not be construed as limiting the invention.

What is claimed is:

1. A detection method for a display panel, for detecting the display panel, wherein the display panel comprises a plurality of light-emitting devices and a plurality of pixel-driving circuits connected to the light-emitting devices, each of pixel-driving circuits comprises a driving transistor, a source of each driving transistor is electrically connected to a first voltage terminal through the corresponding light-emitting device, a drain of each driving transistor is electrically connected to a second voltage terminal, and the display panel detection method comprises following steps:

performing a detection operation on the pixel-driving circuits by applying a gate voltage and a source voltage to a gate and the source of each driving transistor, to turn on the driving transistor, and sampling voltages at the sources as sampled voltages;

repeating the detection operation n times, wherein in each repetition of the detection operation, the gate voltage is a sum of the gate voltage in the initial detection operation, and an accumulative addition of a difference between the gate voltage and the sampled voltage in the previous detection operation, where n is a positive integer; and determining whether a threshold voltage of the driving transistor in each pixel-driving circuit is abnormal, based on the sampled voltage of the driving transistor of each of the pixel-driving circuits from the n-th repeated detection operation.

2. The detection method for the display panel according to claim 1, wherein the step of determining whether the threshold voltage of the driving transistor in each pixel-driving circuit is abnormal based on the sampled voltage of the driving transistor of each of the pixel-driving circuits from the n-th repeated detection operation, comprises:

determining whether the threshold voltage of the driving transistor of the pixel driving circuit is abnormal by comparing an absolute difference between the sampled voltage of the driving transistor of each of the pixel-driving circuits from the n-th repeated detection operation and the gate voltage from the n-th repeated detection operation, with a preset voltage.

3. The detection method for the display panel according to claim 2, wherein the step of determining whether the threshold voltage of the driving transistor of the pixel driving circuit is abnormal by comparing the absolute difference between the sampled voltage of the driving transistor of each of the pixel-driving circuits from the n-th repeated detection operation and the gate voltage from the n-th repeated detection operation, with the preset voltage, comprises:

when the absolute difference between the sampled voltage of the driving transistor of each of the pixel driving circuits from the n-th repeated detection operation and the gate voltage from the n-th repeated detection operation is greater than the preset voltage, it is determined that the threshold voltage of the driving transistor of the pixel-driving circuit is abnormal, and the pixel-driving circuit where the abnormal threshold voltage is detected is an abnormal pixel-driving circuit.

4. The detection method for the display panel according to claim 3, further comprising:

replacing an abnormal threshold voltage of the driving transistor in each of the abnormal pixel-driving circuits by a substitute value; and storing the substitute values of the replaced threshold voltages of the driving transistors of the pixel-driving circuits for compensation.

5. The detection method for the display panel according to claim 4, wherein the substitute values are the threshold voltages of the driving transistors of the normal pixel-driving circuits around the abnormal pixel-driving circuits.

6. The detection method for the display panel according to claim 4, wherein the substitute values are an average value of the threshold voltages of the normal driving transistors of the pixel driving circuits.

7. The detection method for the display panel according to claim 3, further comprising:

transmitting a location information of each abnormal pixel-driving circuit to a repair device, for the repair device to repair each abnormal pixel driving circuit.

8. The detection method for the display panel according to claim 2, wherein the step of determining whether the threshold voltage of the driving transistor of the pixel driving circuit is abnormal by comparing the absolute difference between the sampled voltage of the driving transistor of each of the pixel-driving circuits from the n-th repeated detection operation and the gate voltage from the n-th repeated detection operation, with the preset voltage, comprises:

when the absolute difference between the sampled voltage of the driving transistor of each pixel-driving circuit from the n-th repeated detection operation and the gate voltage from the n-th repeated detection operation is less than or equal to the preset voltage, it is determined that the threshold voltage of the driving transistor of the pixel-driving circuit is normal.

9. The detection method for the display panel according to claim 1, wherein each of the pixel-driving circuits further comprises a scanning transistor, a detection transistor, and a capacitor; for each pixel-driving circuit, a source of the scanning transistor is electrically connected to a data line, a drain of the scanning transistor is electrically connected to the gate of the driving transistor, and a gate of the scanning transistor is electrically connected to a scan line, while a source of the detection transistor is electrically connected to the source of the driving transistor, and a drain of the detection transistor is electrically connected to a detection line, wherein the detection line is electrically connected to an initialization voltage terminal through a first switch, the detection line is also electrically connected to a sampling device through a second switch, a gate of the detection transistor is electrically connected to a control line, and the capacitor is electrically connected between the gate of the driving transistor and the source of the driving transistor.

10. A detection device for a display panel, for detecting the display panel, wherein the display panel comprises a plurality of light-emitting devices and a plurality of pixel-driving circuits connected to the light-emitting devices, each of pixel-driving circuits comprises a driving transistor, a source of each driving transistor is electrically connected to a first voltage terminal through the corresponding light-emitting device, a drain of each driving transistor is electrically connected to a second voltage terminal, and the display panel detection device comprises:

a control device configured to perform a detection operation on the pixel-driving circuits, wherein the detection operation comprises: applying a gate voltage and a source voltage to a gate and the source of each of the driving transistors, to turn on the driving transistor; repeating the detection operation n times, wherein in each repeated detection operation, the gate voltage is a sum of the gate voltage in the initial detection operation, and an accumulative addition of a difference between the gate voltage and a sampled voltage in the previous detection operation, where n is a positive integer; and determining whether a threshold voltage of the driving transistor in each pixel-driving circuit is abnormal, based on the sampled voltage of the driving transistor of each of the pixel-driving circuits from the n-th repeated detection operation;

a sampling device configured to sample voltages at the sources as the sampled voltages in the initial detection operation and the repeated detection operations.

11. The detection device for the display panel according to claim 10, wherein each of the pixel-driving circuits further comprises a scanning transistor, a detection transistor, and a capacitor; for each pixel-driving circuit, a source of the scanning transistor is electrically connected to a data line, a drain of the scanning transistor is electrically connected to the gate of the driving transistor, and a gate of the scanning transistor is electrically connected to a scan line, while a source of the detection transistor is electrically connected to the source of the driving transistor, and a drain of the detection transistor is electrically connected to a detection line.

12. The detection device for the display panel according to claim 11, wherein for each pixel-driving circuit, the detection line is electrically connected to an initialization voltage terminal through a first switch, the detection line is also electrically connected to a sampling device through a second switch, a gate of the detection transistor is electrically connected to a control line, and the capacitor is electrically connected between the gate of the driving transistor and the source of the driving transistor.

13. The detection device for the display panel according to claim 10, further comprising: a chip-on-film (COF) and a gate driving circuit that electrically connect the display panel and a circuit board, the COF comprises a source driver chip for transmitting data signals to data lines, and the gate driving circuit is arranged in a non-display area.

14. The detection device for the display panel according to claim 13, the circuit board comprises a timing control chip, and the timing control chip is electrically connected to the source driver chip and the gate driving circuit to control timing of the source driver chip and the gate driving circuit.

15. The detection device for the display panel according to claim 13, wherein the control device includes a processor, and the processor controls the gate driving circuit and the source driver chip to output a gate voltage and a data voltage by executing program instructions.

16. The detection device for the display panel according to claim 13, wherein the COF comprises a flexible circuit board, and each of the light-emitting devices comprises an organic light-emitting diode (OLED).

17. The detection device for the display panel according to claim 10, further comprising: a repair device for repairing the pixel-driving circuits.

18. The detection device for the display panel according to claim 17, wherein the repair device comprises a laser cutting device for laser cutting short-circuited lines in the pixel-driving circuits.

* * * * *